March 13, 1956 R. C. HANSEN ET AL 2,738,058
PALLET CASE
Filed June 11, 1951 3 Sheets-Sheet 2

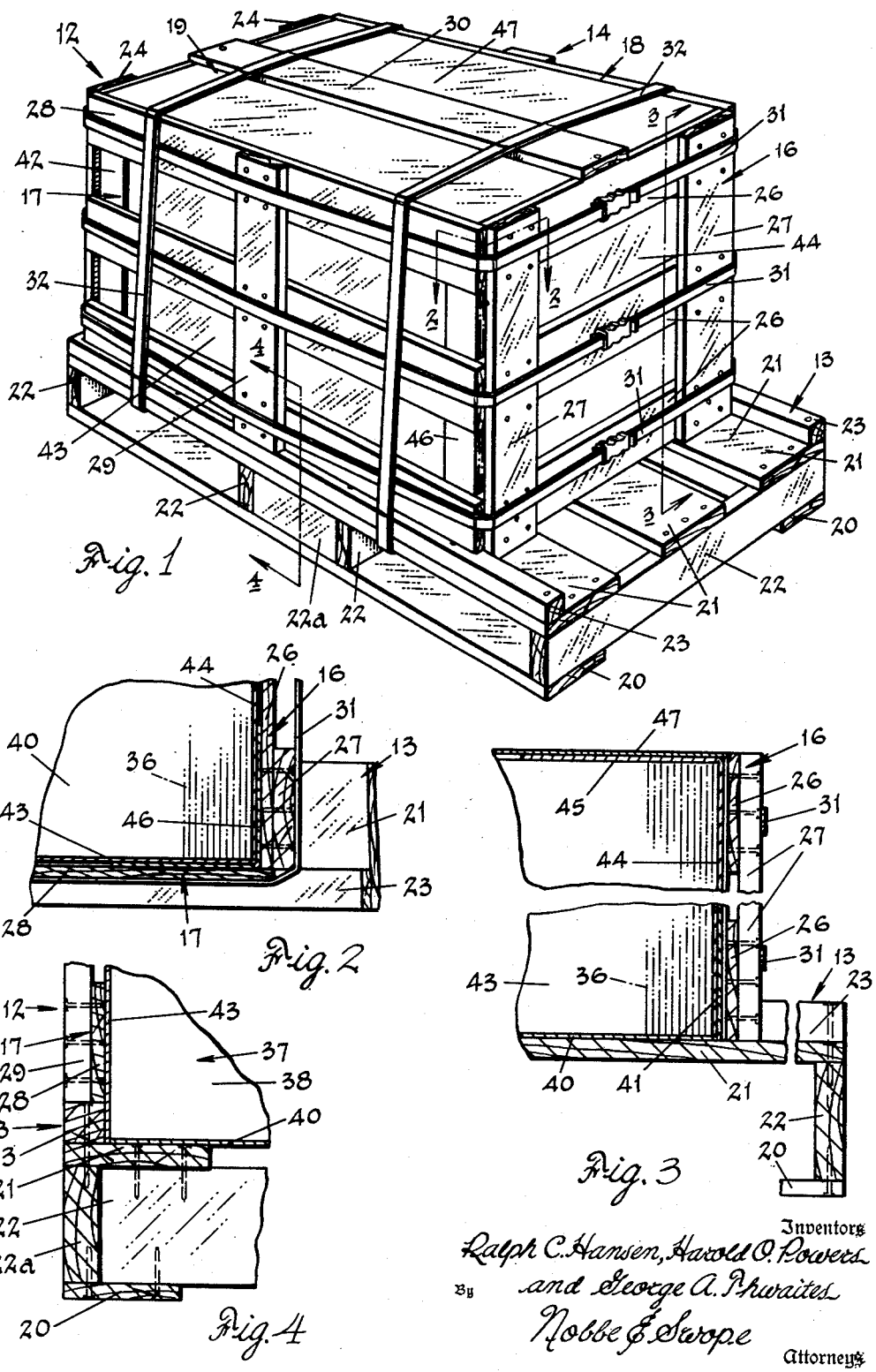

Inventors
Ralph C. Hansen, Harold O. Powers
By and George A. Thwaites
Nobbe & Swope
Attorneys

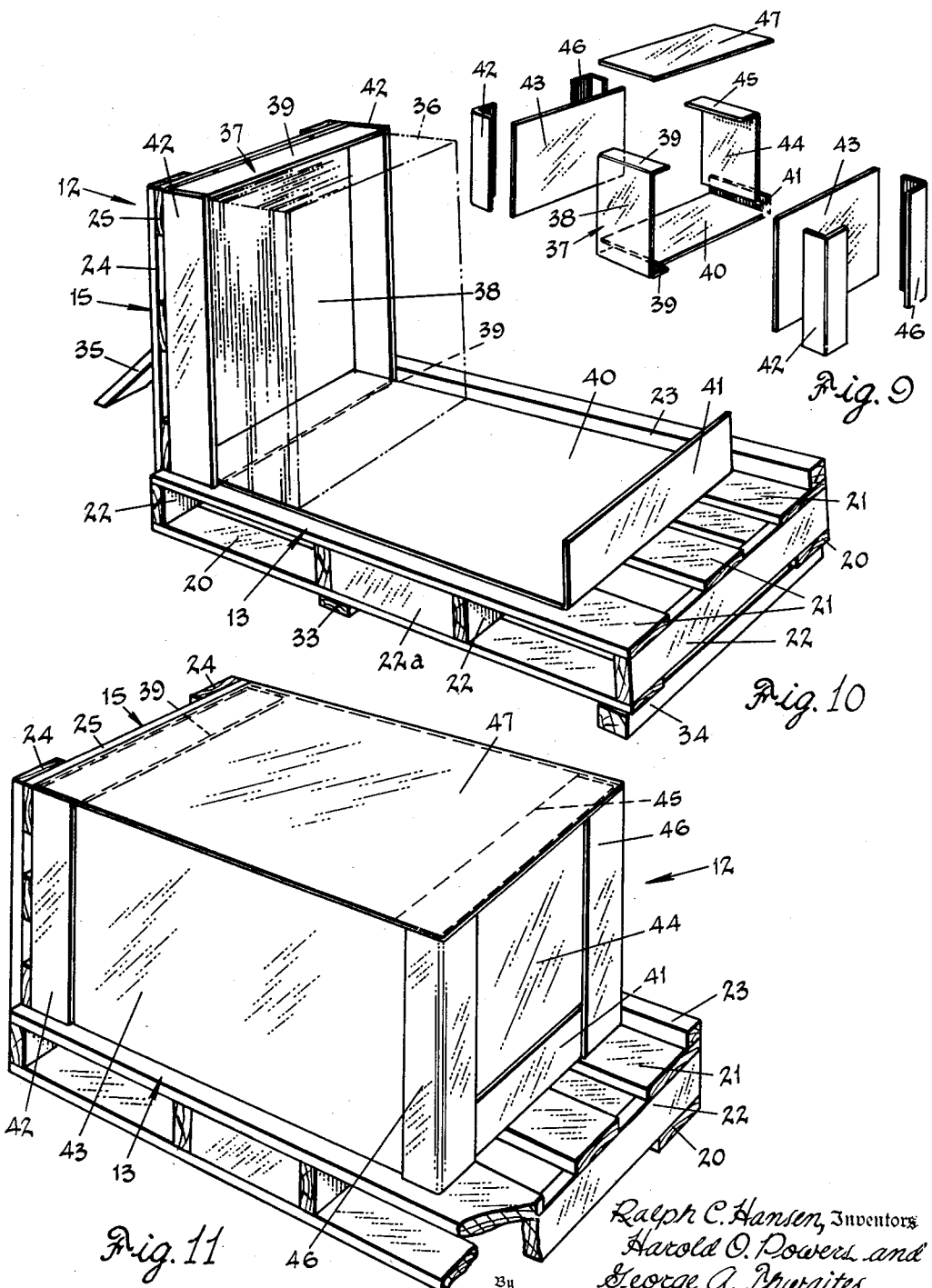

United States Patent Office 2,738,058
Patented Mar. 13, 1956

2,738,058

PALLET CASE

Ralph C. Hansen, Toledo, Ohio, and Harold O. Powers and George A. Thwaites, Charleston, W. Va., assignors to Libbey-Owens-Ford Glass Company, Toledo, Ohio, a corporation of Ohio Application June 11, 1951, Serial No. 231,014

6 Claims. (Cl. 206—62)

The present invention relates broadly to the art of packaging and more particularly to a new and improved pallet case for the storage and transportation of glass sheets and the like.

Heretofore, it has been conventional practice in the glass industry to box sheet glass in either 50 or 100 foot lots, that is, regardless of the thickness or size of the individual sheets, the total footage of glass in the box is 50 or 100 square feet. However, sheets of like thickness and area, as well as quality, are placed in a single box.

Although a variety of boxes designed for 50 and 100 foot lots have been developed which are generally satisfactory as far as avoiding excessive breakage is concerned, this method of packaging leaves something to be desired in the packing and shipping of sheet glass in large quantities. As for example, the handling and warehousing of a substantial number of the customary 50 and 100 foot lot boxes requires considerable time in unloading and stacking, utilizes a large area of valuable warehouse space, and because of their relatively light weight, careless handling and consequent breakage frequently result.

It is therefore an important object of the present invention to avoid the above and many other factors commonly associated with the storage and transportation of boxed glass by the provision of a relatively inexpensive shipping container capable of transporting a greater quantity of sheet glass at less weight with less likelihood of breakage than by heretofore conventional methods.

Another object of the invention is to provide a pallet case which is readily transportable from one location to another by the customary fork lift truck and which may be vertically stacked one upon the other to conserve storage space.

Another object of the invention is the provision of a pallet case by means of which packing, unpacking and warehousing time is considerably diminished, and the space required for unpacking and warehousing substantially reduced.

A further object of the invention is to provide a shipping container which is capable of complete fabrication and which is composed of a minimum number of parts that may be readily and quickly assembled at the situs of the loading operation.

A still further object of the invention is to provide a pallet case in which a relatively larger quantity of glass is packed, thereby allowing a more rapid and accurate inventory to be taken and resulting in the location of a greater quantity of glass at the situs of use.

A still further object of the invention is the provision of a pallet case having a loosely supported end and freely supported side sections whereby a standard size pallet bottom and standard size box may be employed in the packaging and shipment of a variety of glass sheets of different sizes and thicknesses.

Still another object of the invention is to provide a pallet case comprising a pallet type bottom and box carried thereupon, said box having an end section the thickness of which may be varied to accommodate stacks of glass sheets of different thicknesses whereby a standard size box may be utilized for a variety of uses.

Other objects and advantages of the invention will become more apparent during the course of the following description when taken in connection with the accompanying drawings.

In the drawings, wherein like numerals are employed to designate like parts throughout the same:

Fig. 1 is a perspective view of a completed pallet case constructed in accordance with this invention;

Fig. 2 is a horizontal section taken substantially on line 2—2 of Fig. 1;

Figure 5:
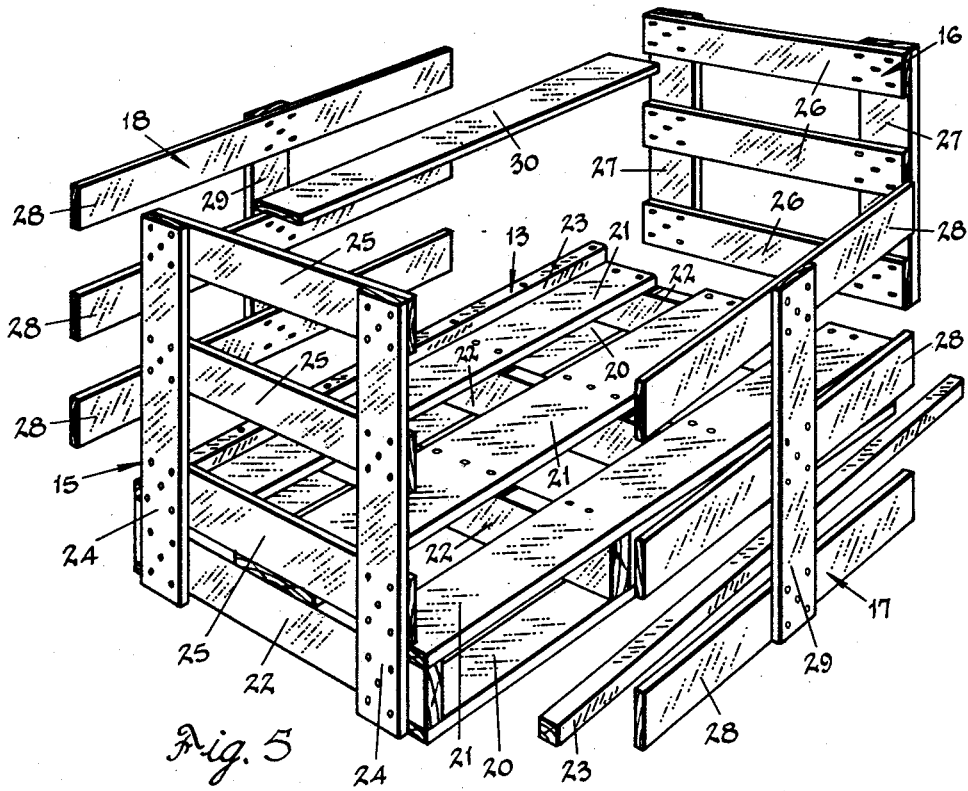
Figure 6:
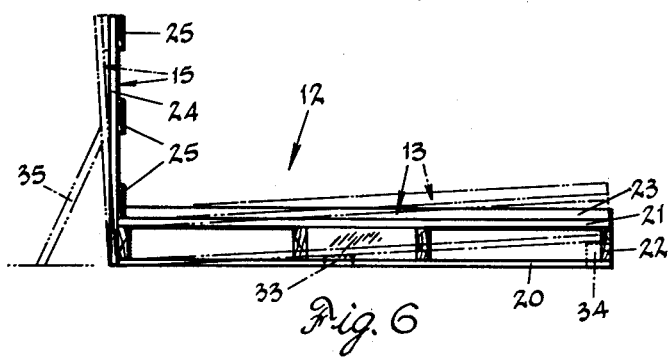
Figure 8:
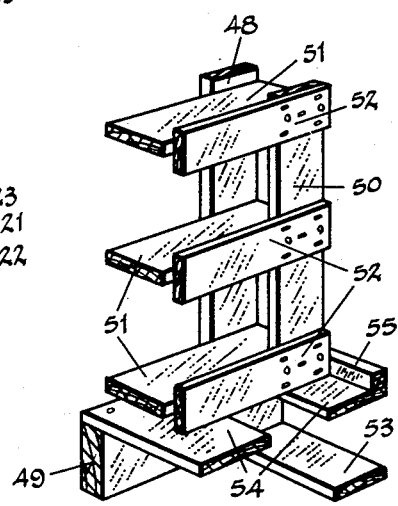
Figure 7:
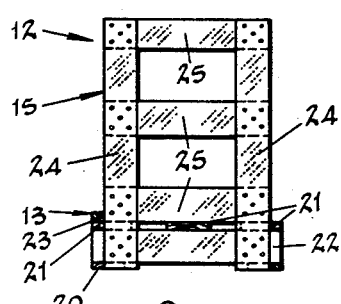

Figs. 3 and 4 are vertical sections taken substantially on lines 3—3 and 4—4, respectively, of Fig. 1;

Fig. 5 is an exploded perspective view of the exterior construction of the pallet case;

Fig. 6 is a perspective view showing the elevation of one end of the case, as during the loading thereof;

Fig. 7 is an end view of the pallet case;

Fig. 8 is a fragmentary perspective view of a stationary end construction which may be used with the container of Fig. 1;

Fig. 9 is an exploded perspective view of filler members which may be employed for packaging glass in accordance with the invention;

Fig. 10 is a perspective view showing one step in the process of loading the pallet case; and Fig. 11 is a perspective view showing another step in the loading of the case, with the filler members in position.

In the accompanying drawings is shown a preferred form of the invention, wherein is provided a substantially rectangular pallet case designated in its entirety by the numeral 12 and comprising a pallet type bottom 13 and substantially rectangular box 14 carried thereupon, the latter consisting of end sections 15 and 16, side sections 17 and 18, and a top or lid 19.

The pallet type bottom, which constitutes the floor or base of the shipping container 12, is composed of longitudinally extending floor boards 20 and deck boards 21. Arranged between and secured to the floor and deck boards are stringers 22 which are disposed at opposite ends of the bottom and also intermediate the ends thereof. In order to grant greater rigidity to the pallet bottom and prevent rotation or movement of the stringers 22, end stringers 22a may be located between the center stringers 22 adjacent the ends thereof and in perpendicular relation thereto. Secured in parallel relation to the outermost deck boards and functioning to locate the glass sheets and brace the box 14 upon the pallet bottom 13 are guide blocks 23.

As may be seen in Figs. 5 and 7, the end section 15 comprises vertical end members 24 secured by nails or the like to horizontal end members 25. The vertical members extend downwardly over the end of the pallet bottom 13 and are secured to the end stringer 22 while the lower horizontal member 25 of the end section 15 rests upon the deck boards 21 and abuts against the blocks 23.

The other end section 16, in contrast to the stationary type construction which identifies the end section 15, is of a floating construction, that is, is not secured to the pallet bottom or box by nailing means. Thus, the end section 16 comprises horizontal end members 26 to which are attached vertical end members 27, the latter being of relatively shorter length than the vertical members 24 of the end section 15. As will be set forth in more detail later and is shown in Fig. 1, the end section 16 is loosely supported upon the deck boards 21 and is held against the glass stack within the box by longitudinal strapping.

Each side section 17 and 18 consists of horizontal side members 28 to which are secured a vertical side member 29, said vertical member and the lower horizontal side member abutting upon the upper surfaces of the blocks 23 and said horizontal side members 28 being in perpendicular contacting relation with the adjacent horizontal end members 25 and 26 of the end sections 15 and 16 respectively. As is also shown in Fig. 1, the outermost edges of the vertical end members 27 and ends of the lower horizontal end member 26 of the end section 16 abut against the inner face of each of the blocks 23.

The top or lid 19 of the box 14 may comprise, as shown in Figs. 1 and 5, a single longitudinally extending top member 30, or may consist of a plurality of such members. Experience has indicated, however, that when a single member 30 arranged centrally of the upper surface of the box and secured at each end to the upper horizontal end members 25 and 26 of the end sections 15 and 16 is employed, the desired protection and rigidity is imparted to the container.

In order to maintain the loosely supported end and freely supported side sections rigid with respect to each other and to the end section 15, and to further assist in securing the completed box 14 to the pallet type bottom 13, there is provided a plurality of longitudinal straps 31 and at least two transversely or laterally extending straps 32. As may be seen in Fig. 1, the longitudinal straps extend completely around the end and side sections of the box and are generally on line with the horizontal members thereof. The transverse straps perpendicularly overlap the longitudinal straps, extend about the girth of the box, and pass beneath the deck boards 21 of the pallet bottom 13, functioning to secure the box to the bottom. Although metal strapping is preferred, leather, cotton and other suitable strapping materials may be used if desired.

In the practice of the invention the stationary end section 15 is secured to the pallet bottom 13 by driving nails or the like through the vertical members 24 of the end section 15 into one of the outer stringers 22. In order to provide means against which the glass sheets may be aligned during the packing operation, and in addition, to prevent the glass sheets from sliding off the pallet bottom during said operation, it is also preferable that one of the blocks 23 be secured to the pallet bottom as shown in Figs. 10 and 11.

To avoid the possibility of breakage of the glass by its falling forward during the packing operation, a relatively thin plank 33 (Fig. 10) is preferably placed under the pallet bottom transversely thereof and outwardly toward the end section 15 from the center of the pallet bottom. To further elevate one end of the pallet bottom, a relatively thicker plank 34 is located under the end of the bottom opposite the end section 15 and in parallel relation to the outer stringer 22. A piece of lumber 35 is also preferably placed at an angle to the end section 15 with one end of the piece 35 against a horizontal member 25 of the section 15 and the other end against the floor or ground. Utilization of this piece of lumber 35 also grants the desired bracing support to the end section 15 during the loading operation.

With the pallet bottom thus elevated and end section braced, as shown in Fig. 6, suitable corrugated cardboard or the like is positioned to impart the desired amount of cushioning protection to the exposed surfaces and edges of the glass sheets. Thus, as may be seen in Figs. 9 and 10, a substantially U-shaped filler member 37 is located whereby the base 38 of the U is in contacting relation with the inner surface of the stationary end section 15 and the legs 39 of the U-shaped member directed inwardly toward the center of the pallet bottom. A substantially flat corrugated member 40 is then located upon the deck boards 21 and one end of said member caused to overlap the lower leg 39 of the U-shaped member 37.

A plurality of glass sheets 36 are then stacked upon the pallet bottom whereby the lower edges of said sheets rest upon the substantially flat member 40 and the first sheet of glass in the stack is in parallel contacting relation with the inner face of the U-shaped member 37. After a predetermined number of glass sheets have been stacked upon the member 40, whereby the last sheet in the stack is resting against the upturned fold 41 of said member 40, angle members 42 are arranged around the corners of the glass stack adjacent the end section 15 and the sheets of corrugated cardboard 43 positioned along the sides of the stack against the end edges of the glass sheets to cushion said edges against chipping. A corrugated end member 44 is next located against the outer surface of the last glass sheet in the stack so that the lower edge of said member is in perpendicular relation to the substantially flat member 40 and against the upturned fold 41 thereof. The end member 44 is preferably provided with an inwardly directed fold 45 which overlaps and cushions the upper edges of the last-placed glass sheets in the stack. Additional angle members 46 are arranged around the other two corners of the stack of glass sheets and a layer of corrugated material 47 placed upon the upper edges of the sheets to grant cushioning protection thereto. It may thus be seen that by the provision of the corrugated members above described all edges and surfaces of the glass sheets are adequately protected against scratching and chipping and thereby granted the requisite cushioning protection. Experience has indicated that double-face corrugated cardboard, fiberboard, paperboard or the like furnish the desired amount of cushioning support. Also, in accordance with customary procedure, sheets of paper, wood flour or other similar materials are preferably placed between the individual glass sheets to prevent scratching of the surfaces thereof.

When the predetermined number of glass sheets have been stacked upon the pallet bottom and the cushioning members above described have been applied, the other block 23 is secured to the pallet bottom by attachment to a deck board 21, the side sections 17 and 18 located against the glass sheet stack and upon the blocks 23, the end section 16 positioned against the end of the stack and between the blocks 23, and the top member 30 secured to the upper ends of the end sections 15 and 16, as by nailing. The longitudinal straps 31 are first applied around the length of the box 14, as shown in Fig. 1, and the transverse straps 32 arranged and tightened around the girth of the box and beneath the deck boards to secure the box to the pallet bottom and to assist in maintaining the floating end and side sections against the glass stack.

As is apparent from the above, the herein disclosed pallet case may not only be readily and quickly assembled due to the absence of nailing or other means securing the end sections to the side sections, and for the same reason may be disassembled with equal facility, but the present invention is capable of use for a variety of sizes of glass sheets without expensive and burdensome changes.

Thus, as shown in Fig. 1, the pallet type bottom 13 may be of one or more predetermined standard lengths and may be utilized with a box 14 of varying length. It is to be noted in the drawings that the box 14 shown does not occupy the entire upper area of the pallet bottom. However, a box of greater or lesser length, designed for a greater or lesser quantity of glass sheets may be employed with equal success. Further, the container shown may be effectively used for glass sheets of relatively lesser length by merely moving the blocks 23 inwardly toward the center of the pallet bottom and employing a box of relatively smaller dimensions. It may thus be seen that a considerable variety of sizes of glass sheets or plates may be packaged using one or more standard size pallets, thereby reducing the cost of the packing operation.

Similarly, a relatively small number of standard size boxes are necessary, this important feature of the invention being rendered possible by the construction shown in Fig. 8. Thus, a box of standard size, such as is shown, may be utilized for the packaging and shipment of a relatively smaller stack of glass sheets, that is, a stack of relatively lesser thickness than standard. To accomplish this desirable objective there is herein provided what may be termed "a stationary end construction" which may be employed in place of the end section 15 shown in Figs. 5 and 7 particularly. This construction comprises outer vertical end members 48, which may be the equivalent of the members 24 above described, secured to the outermost stringer 49 and spaced from the inner vertical members 50 by horizontal end spacers 51. In addition, horizontal members 52 are attached to the vertical members 50 to brace the same and provide a surface against which the glass sheets may be stacked. The remainder of the construction is substantially as above described, that is, the pallet bottom comprises floor planks 53, deck planks 54 and guide blocks 55. The end spacers 51 may be of varying widths, depending upon the thickness of the glass stack. This novel type construction, when used in conjunction with a standard size box, functions to distribute the weight of the glass stack more to the center of the pallet bottom, thereby substantially precluding the possibility of the pallet case tipping during shipment, and in addition, as has been noted, allowing the use of one standard size box for a variety of glass stack thicknesses. As is apparent, the same method of packaging the glass sheets above disclosed is employed when the stationary end construction is utilized.

The present invention has the further advantage of simplified disassembly upon reaching its destination. The unpacking procedure involves the simple steps of elevating and blocking the case by the planks 33 and 34 and piece of lumber 35 as shown in Fig. 6, cutting the strapping, removing the top 19, floating or loosely supported end section 16, side sections 17 and 18, one of the blocks 23 and the corrugated cushioning members. The glass sheets are now exposed and ready for use. When a portion of the stack of glass sheets has been used and it is decided to return the pallet case to storage, the substantially flat corrugated member 40 is folded upwardly over the exposed end of the stack, the floating end section 16 is strapped in place against the end of the stack, the elevating and bracing planks 33, 34 and 35 removed, and the pallet case moved by conventional fork lift means to the warehouse.

Although the invention has been described above with reference to the packaging and shipment of glass sheets or plates, it will be appreciated that the container is suitable for a variety of uses and is not restricted to the purpose herein disclosed.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In a shipping container of the character described for a stack of glass sheets and the like; a bottom comprising a deck and members elevating said deck from a supporting surface to permit entry of lift forks beneath said deck; a plurality of glass sheets supported on edge upon said deck, longitudinally extending guide blocks attached to the upper surface of the deck and extending entirely along opposite sides thereof for receiving the stack of glass sheets therebetween; an end section comprising vertical members fixedly secured to said bottom, additional vertical members supported upon the deck and spaced from said first-mentioned vertical members by horizontal spacer members, and additional horizontal members secured to said last-mentioned vertical members, said last-mentioned horizontal and vertical members abutting against the guide blocks; side sections freely supported upon the guide blocks in abutting relation to said end section; an end section of lesser size than said other end section freely supported upon the deck inwardly of the end thereof between the guide blocks and capable of movement toward and away from said fixed end section; a top disposed upon said end sections; and flexible retaining members tying the bottom, end and side sections and top together.

2. A container including a pallet-type bottom, a fixed end section secured to one end of said bottom to extend vertically therefrom, a pair of elongated guide members secured to said bottom in spaced relation and positioned perpendicular to said fixed end section, a load freely positionable upon said bottom in snugly fitting relation between said guide members and abutting said fixed end section, side sections respectively freely positionable upon said guide members in abutting relation with said load, a second end section freely positionable upon said bottom between said guide members and in abutting relation to said load, a top section fixedly positionable upon said load, and flexible means encompassing said bottom, ends, sides and top sections in compressive, non-shiftable relation to said load.

3. A container including a pallet-type bottom, a fixed end section of relatively lesser width than the bottom and secured to one end of said bottom to extend vertically therefrom, a pair of elongated guide blocks secured to the top of said bottom in spaced relation and positioned perpendicular to said fixed end section, a load freely positionable upon said bottom in snugly fitting relation between said guide blocks and abutting said fixed end section, side sections respectively freely positionable upon said guide blocks in abutting relation with the sides of said load and said fixed end section, a second end section of equivalent width but lesser height than said fixed end section and freely positionable upon said bottom in snugly fitting relation between said guide blocks and in abutting relation to said load, a top section fixedly positionable upon said load and said end sections, and flexible means encompassing said bottom, ends, sides and top sections in compressive, non-shiftable relation to said load.

4. A container including a pallet-type bottom, a fixed end section of relatively lesser width than the bottom and secured to one end of said bottom to extend vertically therefrom, a pair of elongated guide blocks secured to the top of said bottom in spaced relation and positioned perpendicular to said fixed end section, said guide blocks respectively abutting the sides of said fixed end section, a load freely positionable upon said bottom in snugly fitting relation between said guide blocks and abutting said fixed end section, side sections respectively freely positionable upon said guide blocks in abutting relation with the sides of said load and the sides of said fixed end section, a second end section of equivalent width but lesser height than said fixed end section and freely positionable upon said bottom in snugly fitting relation between said guide blocks and in abutting relation to said load, a top section fixedly positionable upon said load and the tops of said end sections, and flexible means encompassing said bottom, ends, sides and top sections in compressive, non-shiftable relation to said load.

5. A container for sheet materials including a pallet-type bottom, a fixed end section secured to one end of said bottom to extend vertically therefrom, a pair of elongated guide blocks secured to the top of said bottom in spaced relation and positioned perpendicular to said fixed end section, a plurality of sheet elements freely positionable in edgewise relation upon said bottom and parallel to said fixed end section, said sheet elements being positioned between said guide blocks in snugly fitting relation, side sections respectively freely positionable upon said guide blocks in abutting relation with said sheet elements, a second end section freely positionable upon said bottom between said guide blocks and in abutting relation to said sheet elements, a top section fixedly positioned upon said sheet elements and the tops of said end sections, and flexible means encompassing said bottom, ends, sides and top sections in compressive, non-shiftable relation to said sheet elements.

6. A sheet glass package comprising a shipping container including a pallet-type bottom, a fixed end section secured to one end of said bottom to extend vertically therefrom, a pair of elongated guide blocks secured to said bottom in spaced relation and positioned perpendicular to said fixed end section, a plurality of glass sheets stacked one against the other and against said end section and having their major surfaces parallel to said fixed end section, said sheets being supported on edge upon said bottom between and in snugly fitting engagement with said guide blocks, side sections respectively freely positionable upon said guide blocks and in abutting contact with the sides of said fixed end section and with the stack of glass sheets, a second end section of equivalent width but lesser height than said fixed end section and freely positionable upon said bottom between said guide blocks and in abutting relation to the stack of glass sheets, a top section fixedly positioned upon said stack of glass sheets and the tops of said end sections, and flexible means encompassing said bottom, end, sides and top sections in compressive, non-shiftable relation to the stack of glass sheets.

References Cited in the file of this patent

UNITED STATES PATENTS

| | | |
|---|---|---|
| 1,032,783 | Shaw | July 16, 1912 |
| 1,618,542 | Ludwig | Feb. 22, 1927 |
| 1,705,003 | Crosley | Mar. 12, 1929 |
| 1,982,437 | Knowlton | Nov. 27, 1934 |
| 2,005,099 | McLeod | June 18, 1935 |
| 2,159,622 | Sanford | May 23, 1939 |
| 2,299,175 | Procissi et al. | Oct. 20, 1942 |
| 2,503,562 | Porter | Apr. 11, 1950 |

FOREIGN PATENTS

| | | |
|---|---|---|
| 322,817 | Great Britain | Dec. 16, 1929 |